March 3, 1970 J. E. P. PICKETT 3,498,860
PROCESS OF MOUNTING PRECOATED COVER GLASS FOR MICROSCOPE SLIDES
Filed Aug. 29, 1966
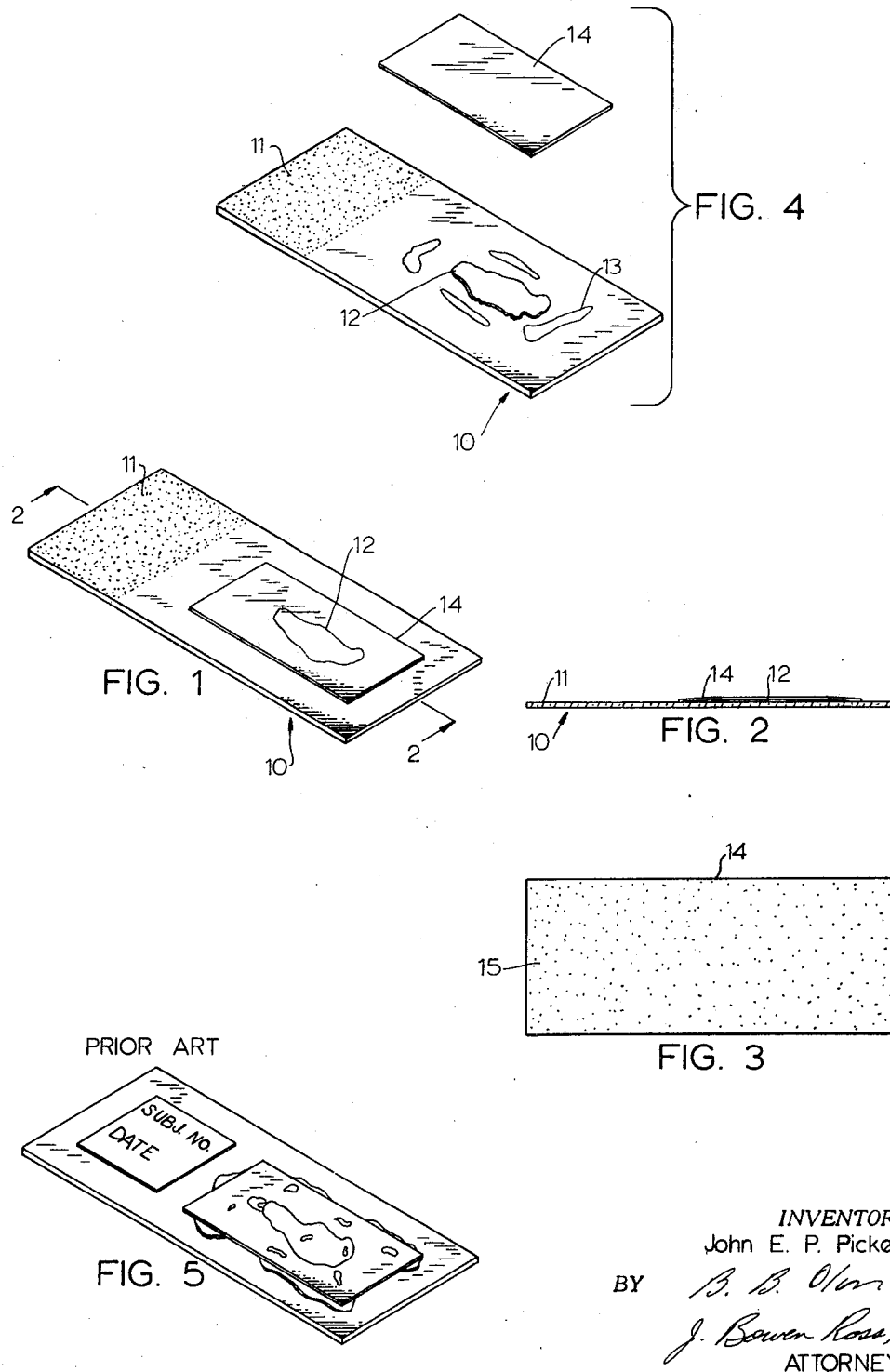
INVENTOR.
John E. P. Pickett
BY
ATTORNEYS

United States Patent Office 3,498,860
Patented Mar. 3, 1970

3,498,860
PROCESS OF MOUNTING PRECOATED COVER GLASS FOR MICROSCOPE SLIDES
John E. P. Pickett, 3323 Pinafore Drive,
Durham, N.C. 27705
Filed Aug. 29, 1966, Ser. No. 575,574
Int. Cl. B32b 31/00
U.S. Cl. 156—57    6 Claims

ABSTRACT OF THE DISCLOSURE

A cover glass is precoated with an adhesive which, upon being associated with a tissue clearing fluid, is adapted to be mounted on a glass slide and to permanently cover a stained tissue specimen carried by the glass slide.

---

In the preparation of stained tissue specimens for microscopic examination, a glass slide which mounts the stained tissue specimen is removed from a holding tank and is wiped free of the excess tank fluid which clings to the surface of the glass slide. The tank fluid is generally a tissue clearing fluid such as xylene or toluene. A measured drop of adhesive such as Permount, Canada balsam or the like is then placed on the tissue specimen upon which is mounted a cover glass. Care must be taken when mounting the cover glass to prevent air pockets from forming in the area of the tissue specimen for such air pockets cause optical distortion and render that portion of the slide worthless. The cover glass is then slightly pressed against the glass slide to cause the adhesive to permeate the tissue specimen and to squeeze the excess adhesive outwardly from the contiguous area of contact between the cover glass and the glass slide. The excess adhesive is then removed from around the periphery of the cover glass by another wiping step and care must be taken to remove all of that excess for the adhesive characteristically remains tacky and upon storing of the same, tends to stick to adjacent glass slides. Lastly, the glass slides having the tissue specimen and the cover glass mounted thereon are placed in batch quantities in an oven for about two hours to hasten the drying of the adhesive.

It can be seen that the above described process is very time-consuming and laborious; also, a skilled technician must be employed for carrying out such a process. Other objections include the wiping of both the excess tank fluid and the excess adhesive from the glass slide, the drying time required by the adhesives and the necessity of the oven, and the care which must be taken in properly mounting the cover glass on the glass slide and the tissue specimen. With specific regard to drying time, a pathologist quite often in diagnosing a cancer smear must examine the slide during an operation on the patient. With the emphasis on time, the pathologist cannot wait until the adhesive dries but must proceed while the cover glass is mobile on the glass slide. The pathologist must use extreme care when examining a slide in this state for the slightest movement of the cover glass relative the glass slide destroys the cellular structure of the tissue specimen or smear and an accurate diagnosis cannot be obtained.

Therefore, an object of this invention is to provide a precoated cover glass or plastic cover slide which is adapted to be mounted directly on a glass base slide or plastic base slide and tissue specimen upon their removal from a holding tank.

Another object of this invention is to provide a process for coating a cover glass and for mounting said coated cover glass on a glass slide and tissue specimen whereby the cover glass, the tissue specimen and the glass slide form a composite, unitary structure.

A further object of this invention is to provide a cover glass with a coating which is comprised of an acrylic adhesive being soluble in xylene, toluene and like tissue clearing fluids.

Yet another object of this invention is to provide a precoated cover glass with the coating being substantially optically clear and having substantially the same refractive index in thin layers as glass.

Still another object of this invention is to provide a precoated cover glass or plastic cover slide with the coating thereof being adapted to permeate a tissue specimen which is mounted on a glass base slide or plastic base slide and which is chemically compatible with the same.

Still a further object of this invention is to provide a process for sandwiching a tissue specimen between a glass slide and a cover glass which is efficient, economical and which will remain stable over long periods of time.

Other objects and advantages of this invention will become apparent when the following detailed description is read in conjunction with the appended drawings, specification and claims. A preferred embodiment of this invention will now be described with reference to the accompanying drawings, in which:

FIGURE 1 is a perspective view of the composite microscope slide showing the glass slide and the cover glass embedding a tissue specimen;

FIGURE 2 is a section view taken along lines 2—2 of FIGURE 1 showing the tissue specimen embedded between the cover glass and the glass slide;

FIGURE 3 is an enlarged plan view of the cover glass showing the same having been precoated with an adhesive resin;

FIGURE 4 is an exploded, perspective view showing the precoated cover glass in position to be placed on a glass slide mounting a tissue specimen and being wet with a clearing fluid which may be xylene or toluene and which acts as a solvent for the adhesive resin; and FIGURE 5 is a perspective view of microscopic slide of the prior art showing a cover glass and a glass slide mounting a tissue specimen and showing the excessive adhesive having leached from between the cover glass and the glass slide and air bubbles which are trapped between the same.

In accordance with this invention, a cover glass is precoated with an adhesive and is allowed to dry. It is contemplated that large numbers of cover glasses will be precoated at a time and that each cover glass shall receive a coating which is substantially the thickness as the coatings applied to the other cover glasses. While the adhesive may be applied to the cover glasses in liquid form, it has been found that an aerosol type application is quicker and more evenly distributes the adhesive over the face of the cover glass. Such an aerosol type adhesive spray is manufactured by the Sherwin-Williams Company under the trademark "Kem Hi-Gloss" and is comprised of a non-volatile acrylic resin dissolved in a volatile aromatic hydrocarbon and which is propelled by a halogenated hydrocarbon such as Freon. The acrylic resin may be a polyacrylate, a polymethacrylate or copolymers of the same and the volatile aromatic carbon may be xylene or the like. Upon spraying a cover glass with the acrylic adhesive, the aromatic hydrocarbon solvent evaporates leaving a slick non-tacky film of acrylic adhesive on the cover glass. Since the adhesive film comes into contact with various other foreign substances such as other cover glasses, it is imperative that the adhesive film not be tacky or have the tendency to adhere to these foreign objects. It is contemplated that other adhesives may be used such as polyvinyl ether, polyvinyl acetate, polyvinyl chloride and the like and copolymers thereof; however, these adhesives upon drying must present a non-tacky surface, must be soluble in the tissue clearing fluid which most likely will be xylene or toluene, must be optically clear in thin layers, must be compatible with the tissue specimen and adapted to be absorbed thereby, must have a light refractance substantially the same as glass in thin layers, and must dry readily after being associated with xylene or toluene.

In mounting the precoated cover glass onto a glass slide, the glass slide which carries the tissue specimen is removed from a clearing tank which contains xylene or toluene. The glass slide is laid onto a surface and without wiping any of the clearing fluid from the glass slide, the precoated cover glass is then laid directly on the upper surface thereof so as to cover the tissue specimen. When the adhesive which is coated on the cover glass comes into contact with the clearing fluid which clings to the glass slide, the adhesive is dissolved thereby and permeates the tissue specimen and flows into contact with the cover glass in the area beneath the cover glass and outside the area as defined by the tissue specimen. Slight pressure is exerted on the cover glass to insure an intimate contact between the adhesive carried by the cover glass and the glass slide and also to force outwardly any air pockets which may have been trapped between the cover glass and the glass slide. Within a few minutes, sufficient quantities of xylene have evaporated so as to firmly secure the cover glass on the glass slide and adapt the composite slide to be either viewed by a pathologist or stored for future use.

The invention is illustrated in connection with the accompanying drawings in which the figures are illustrative of the preferred embodiment of the invention.

A standard glass slide 10 which is generally one inch wide by three inches long is provided with etched portion 11 which covers a small segment of the upper surface of one end thereof and is adapted to receive pencil indicia for classifying the slides according to a particular code number. In the center of the unetched portions of glass slide 10, a tissue specimen 12 is mounted which is to be observed by a pathologist. In reference to FIGURE 4, glass slide 10 has been removed from a clearing fluid such as xylene or toluene and is still wet with that fluid as denoted by the reference numeral 13. A cover glass 14 as shown in FIGURE 3 has been precoated with an acrylic adhesive shown as reference numeral 15 which has been dried thereon. Cover glass 14 is thus adapted to be applied to glass slide 10 while the same is wet with xylene 13 so as to sandwich tissue specimen 12 therebetween as shown in FIGURE 1. The xylene quickly evaporates from the area between glass glide 10 and cover glass 14 leaving the cover glass 14 permanently bonded to glass slide 10.

The adhesives as contemplated by this invention for precoating cover glass 14 may be the polymerization product of an acrylic ester of the general formula:

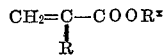

wherein R is a hydrogen or a methyl group and $R^x$ represents, when R is methyl, a primary or secondary alkyl group of not over eighteen carbon atoms and preferably from five to eighteen carbon atoms, or, when R is hydrogen, an alkyl group of not over eighteen carbon atoms and, preferably, from two to twelve carbon atoms. It is also contemplated that the adhesive may be a copolymer comprising the above defined polyacrylic ester and a vinyl compound of the general formula:

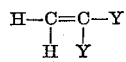

wherein Y may be selected from the group consisting of alkyl, hydrogen, halides, nitriles, carboxyl and amides. The copolymer may further include a vinyl alkyl ester having the general formula:

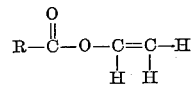

wherein R is an alkyl group having from two to eighteen carbon atoms and can be normal or branched.

The following example illustrates the process of this invention; however, it is to be understood that this invention is not to be confined to this example.

EXAMPLE

A glass slide having a tissue specimen mounted thereon as well as coded indicia was withdrawn from a tank containing a xylene cleaning fluid and laid upon a table where it was to receive a cover glass for covering the tissue specimen. A cover glass of the standard type was sprayed an acrylic resin which may be purchased from the Sherwin-Williams Company under the trademark "Kem-Hi-Gloss" and was allowed to dry. The Kem-Hi-Gloss spray was comprised of fifty percent of a halogenated hydrocarbon propellant and fifty percent of a varnish with the varnish being comprised of eighty-six percent of a volatile aromatic hydrocarbon and fourteen percent of a non-volatile acrylic resin. While the surface of the glass slide mounting the tissue specimen was still completely wet with xylene, the cover glass was placed thereon so that the precoated adhesive portion thereof contacted the xylene and the tissue specimen. Immediately upon the xylene becoming associated with the acrylic resin, the resin was dissolved thereby and permeated the tissue specimen. Slight pressure was applied to the cover glass whereupon all air pockets were forced outwardly from between the cover glass and the glass slide thus insuring an intimate contact between the cover glass and the glass slide. The composite glass slide was then allowed to dry for a period of two minutes in order to permit sufficient quantities of the xylene solvent to evaporate and to permanently affix the cover glass to the glass slide. After the drying period, the composite glass slide was available to be microscopically examined by a pathologist.

The glass slide and cover glass of this invention and that generally used by the industry are approximately three inches long and one inch wide and approximately one and five-eighth inches long and seven-eighths of an inch wide, respectively. Within recent years, research has been done with respect to plastic slides and covers which are inert to the chemicals in which the tissue specimens are immersed and which have substantially the same optical refractance as glass. Such plastic slides are especially adapted to be mailed by a local physician to a regional hospital for the breakage problem is substantially eliminated. The invention as disclosed herein is adaptable for use with plastic slides and covers and the procedure as outlined above is to be followed. The plastic film strip as contemplated by this invention may be a plastic as described in the March 1960 issue of the American Medical Association, Archives of Pathology and in the April 1964 issue of the same journal.

What is claimed is:
1. A process for preparing a transparent base slide which mounts a stained tissue specimen and which resides in an aromatic hydrocarbon fluid bath for pathological examination comprising the steps of:
  (a) precoating a surface of a transparent cover slide with an adhesive, said adhesive being soluble in said fluid comprising said aromatic hydrocarbon fluid bath and being compatible with said stained tissue specimen when associated with the same;
  (b) drying said adhesive on said surface, said adhesive upon the drying thereof presenting a slick, non-tacky surface;
  (c) removing said transparent base slide mounting said stained tissue specimen from said fluid bath;
  (d) embedding said stained tissue specimen between said cover and base slides by laying said adhesive coated surface of said cover slide on said base slide and over said tissue specimen while said base slide and tissue specimen are still wet with said bath fluid whereby said adhesive is at least partially dissolved whereupon it permeates said tissue specimen and contacts said base slide; and (e) at least partially drying said adhesive so that said cover slide is securely adhered to said base slide.

2. The process of claim 1 wherein said fluid comprising said aromatic hydrocarbon fluid bath is selected from the group consisting of toluene and xylene.

3. The process of claim 2 wherein said cover slide and said base slide are comprised of glass.

4. The process of claim 2 wherein said cover slide and said base slide are comprised of a transparent plastic being inert to toluene and xylene.

5. A process for preparing a transparent base slide which mounts a stained tissue specimen for pathological examination immediately upon its removal from an aromatic hydrocarbon liquid bath comprising the steps of:

(a) laying a precoated surface of a transparent cover slide in contact with said wetted base slide so as to embed said stained tissue specimen between said cover slide and said base slide, said coating of said precoated surface comprising an adhesive being compatible with and soluble in said bath liquid whereby upon the contacting of said wetted base slide, said adhesive is at least partially dissolved in said bath liquid clinging to said base slide and permeates said tissue specimen; and (b) evaporating sufficient quantities of said bath liquid trapped between said cover and base slides to cause said cover slide to be securely adhered to said base slide.

6. The process of claim 5 wherein said fluid comprising said aromatic hydrocarbon liquid bath is selected from the group consisting of toluene and xylene.

References Cited

UNITED STATES PATENTS

| 2,773,050 | 12/1956 | Caldwell et al. | 117—124 X |
| 3,130,099 | 9/1960 | Homburger | 156—57 |

FOREIGN PATENTS

| 734,331 | 7/1955 | Great Britain. |

OTHER REFERENCES

Pickett, John Phillip, and Sommer, Joachim R.: "35 mm. Film as Mounting Base and Plastic Spray as Cover Glass for Histologic Sections," abstract received June 19, 1960.

Riley, Malcom W.: "Joining and Fastening Plastics," Materials in Design Engineering, January 1958, pp. 129–134.

JOHN T. GOOLKASIAN, Primary Examiner

R. A. KILLWORTH, Assistant Examiner

U.S. Cl. X.R.

156—308, 310; 350—92; 424—3